United States Patent
Jung et al.

(10) Patent No.: US 9,375,769 B2
(45) Date of Patent: Jun. 28, 2016

(54) METHOD FOR MANUFACTURING DRIVE SHAFT

(71) Applicant: Jong Hoon Jung, Changwon-si, Gyeongsangnam-do (KR)

(72) Inventors: Jong Hoon Jung, Changwon (KR); Dong Gun Kim, Changwon (KR)

(73) Assignee: Jong Hoon Jung, Changwon-Si, Gyeongsangnam-Gu (KR)

( * ) Notice: Subject to any disclaimer, the term of this patent is extended or adjusted under 35 U.S.C. 154(b) by 44 days.

(21) Appl. No.: 14/327,349

(22) Filed: Jul. 9, 2014

(65) Prior Publication Data

US 2016/0008862 A1   Jan. 14, 2016

(51) Int. Cl.
*B21C 1/24* (2006.01)
*B21D 53/84* (2006.01)
*B21D 41/04* (2006.01)
*B21C 3/16* (2006.01)
*B21C 3/02* (2006.01)
*B21C 9/00* (2006.01)
*F16C 3/02* (2006.01)

(52) U.S. Cl.
CPC ... *B21C 1/24* (2013.01); *B21C 3/02* (2013.01); *B21C 3/16* (2013.01); *B21C 9/00* (2013.01); *B21D 41/04* (2013.01); *B21D 53/84* (2013.01); *F16C 3/02* (2013.01); *F16C 3/023* (2013.01); *F16C 2220/42* (2013.01)

(58) Field of Classification Search
CPC ............. B21C 3/02; B21C 3/16; B21C 1/24; B21D 41/04; B21D 53/84
See application file for complete search history.

(56) References Cited

FOREIGN PATENT DOCUMENTS

| KR | 10-1199767 | 11/2012 | |
|---|---|---|---|
| KR | 101199767 | * 11/2012 | ............. B21D 41/04 |

* cited by examiner

*Primary Examiner* — Debra Sullivan
(74) *Attorney, Agent, or Firm* — Rodman & Rodman LLP (57) ABSTRACT

Disclosed in a method for manufacturing a drive shaft which comprises forming a first shaft unit by shrinking one side of a metallic pipe which has a uniform first strength; decreasing the thickness of an intermediate portion of the metallic pipe by drawing the intermediate portion of the metallic pipe which is integral with the first shaft unit; forming at an inner side surface of the other side of the metallic pipe a strength decrease unit which has a second strength smaller than the first strength, by heat-treating by a predetermined distance the inner side surface of the other side being opposite to one side of the metallic pipe; and forming a second shaft unit without transforming any portion of the intermediate portion by shrinking the metallic pipe which has the strength decrease unit, wherein the second shaft unit is formed by applying compression force to a portion where the strength decrease unit in the metallic pipe is formed, in a predetermine direction being vertical with respect to the axial direction of the metallic pipe.

13 Claims, 5 Drawing Sheets

METHOD FOR MANUFACTURING DRIVE SHAFT

TECHNICAL FIELD

The present invention relates to a method for manufacturing a drive shaft, and particularly to a method for manufacturing a drive shaft which makes it possible to prevent the bending and strain of as metallic pipe which used to happen when forming as drive shaft, in such a way to shrink a metallic pipe, while obtaining less weight, vibrations, manufacturing cost and investment in manufacturing facilities as well as preventing the bending of a shaft in the course of shrinking a metallic pipe.

BACKGROUND ART

In case of a rear wheel drive or four wheel drive vehicles, the power of a vehicle engine is transferred through as transmission and a drive shaft connected to the transmission to differential gears of a vehicle, and the vehicle may be driven based on a rear wheel drive or a four wheel drive by means of the driving force transferred through the differential gears to the rear wheels of the vehicle.

Here, since the torsion stress applied to a drive shaft configured to transfer the driving force of a transmission to differential gears generally concentrates on the surface of the drive shaft, a tubular drive shaft has been widely used in an effort to decrease the weight of a vehicle while maintaining strength.

The method for obtaining a desired structure in a drive shaft is characterized in that one side of a metallic pipe is shrunk, and the other side being opposite to the one side of the metallic pipe is shrunk, and both the shrunk sides are fixed and drawn.

When an end of the drive shaft is shrunk, and the other end being opposite to the end is shrunk, the shrinking portions and the portions where are not shrunk have the same strengths, so the portions where are not shrunk may be bent or transformed in the course of shrinking.

Since it is hard to recycle the drive shaft which has defects took place in the course of shrinking, such defective drive shafts should be discarded.

According to an invention entitled "a method for manufacturing a drive shaft" which was filed on Feb. 14, 2012 and was assigned the application number 10-2012-0014634, and was issued on Nov. 5, 2012 and was assigned the Korean patent number 10-0099797, an inner side surface of the other side of a metallic pipe is heat-treated for thereby forming a strength decrease unit which has a second strength smaller than a first strength of a metallic pipe, and the metallic pipe with the strength decrease unit is shrunk for thereby manufacturing a drive shaft without any strain at an intermediate portion.

According to the above-described Korean registration patent, the shrinking is performed using a plurality of shrinking forms whose diameters gradually decrease.

When the diameter of the metallic pipe with the strength decrease unit is decreased using a plurality of shrinking forms whose diameters gradually decrease, the manufacturing time increases longer than expected. Since a plurality of shrinking forms are used, the shrinking apparatus may need large area.

In addition, when shrinking the pipes with the aid of a plurality of shrinking forms, the force in the axial direction of the metallic pipe may be weakened, for which the axis of the metallic pipe may be distorted or the axes of the shrunk portions and the portions where are not shrunk may deviate from each other.

In addition, since the shrinking is generally performed with the aid of the shrinking forms while applying force in an axial direction of the metallic pipe, over force may be applied in an axial direction of the metallic pipe, so cracks may occur between the shrunk portions and the portions where are not shrunk.

DISCLOSURE OF THE INVENTION

Accordingly, it is an object of the present invention to provide a drive shaft and a method for manufacturing the same which make it possible to obtain less bending, strain, vibrations and cracks which used to happen in the course of shrinking when manufacturing a drive shaft. The investment in manufacturing facilities may be saved by lowering manufacturing cost and weight and by simplifying manufacturing processes. It is possible to reduce the area where the shrinking apparatus occupies.

The technical solutions to be achieved by the present invention are not limited to the above-mentioned mentioned solutions, and it is obvious that other technical solutions not mentioned herein may be apparent to a person ordinary in the art with reference to the following descriptions.

To achieve the above objects, there is provided a method for manufacturing a drive shaft, comprising forming a first shaft unit by shrinking one side of a metallic pipe which has a uniform first strength; decreasing the thickness of an intermediate portion of the metallic pipe by drawing the intermediate portion of the metallic pipe which is integral with the first shaft unit; forming at an inner side surface of the other side of the metallic pipe a strength decrease unit which has a second strength smaller than the first strength, by heat-treating by a predetermined distance the inner side surface of the other side being opposite to one side of the metallic pipe; and forming a second shaft unit without transforming any portion of the intermediate portion by shrinking the metallic pipe which has the strength decrease unit, wherein the second shaft unit is formed by applying compression force to a portion where the strength decrease unit in the metallic pipe is formed, in a predetermine direction being vertical with respect to the axial direction of the metallic pipe.

The forming the first shaft unit comprises forming an end of one side of the metallic pipe; and shrinking one side of the formed metallic pipe step by step with the aid of a plurality of shrinking forms whose diameters gradually decrease.

The thickness between the outer diameter and the inner diameter of the first shaft unit is thicker than the thickness of the intermediate portion.

The second shaft unit is configured to move in different directions the divided flat molds which come into contact with an outer circumferential surface of the metallic pipe and have slanted surfaces, for thereby applying to an outer circumferential surface of the metallic pipe a compression force in a predetermined direction being vertical with respect to the axial direction.

The divided flat molds are arranged in a form of a pair of divided flat molds, and the outer side surfaces not facing the metallic pipe are arranged in parallel with each other, and each of the inner side surfaces contacting with the metallic pipe is slanted with respect to each of the outer side surfaces so that the opposite surfaces are parallel with each other.

The second shaft unit is configured to apply compression force to an outer circumferential surface of the metallic pipe in a predetermined direction being vertical with respect to the axial direction of the metallic pipe, with the aid of a plurality of divided core molds coming into contact with an outer circumferential surface of the metallic pipe.

The thickness between the outer diameter and the inner diameter of the second shaft is thicker than the thickness of the intermediate portion.

The drawing comprises inserting a mandrel into the metallic pipe wherein the first shaft unit is formed; and decreasing the thickness of the intermediate portion by inserting the metallic pipe into a drawing mold, wherein the mandrel is inserted in the metallic pipe.

The heat-treating comprises a high frequency heat treatment step for applying high frequency to an inner circumferential surface of the other side of the metallic pipe.

In the forming the first and second shaft units, the first and second shafts are formed by any of hot working and cold working.

The thickness of the strength decrease unit heat-treated from the inner side surface of the metallic pipe is smaller than the thickness of the metallic pipe.

The method further comprises, after the second shaft unit is formed, heat-treating again the first shaft unit, the intermediate portion and the second shaft unit.

The method further comprises, after the second shaft unit is formed, heat-treating again only the second shaft unit.

The method further comprises, after the second shaft unit is formed, forming a spline at either the first shaft unit or the second shaft unit.

The thickness of either the first shaft unit or the second shaft unit is thicker than the thickness between the outer diameter and the inner diameter of the intermediate portion.

INDUSTRIAL EFFECTS

According to the method for manufacturing a drive shaft, it is possible to obtain less bending, strain, vibrations and cracks which used to happen in the course of shrinking when manufacturing a drive shaft. The investment in manufacturing facilities may be saved by lowering manufacturing cost and weight and by simplifying manufacturing processes. It is possible to reduce the area where the shrinking apparatus occupies.

BRIEF DESCRIPTION OF THE DRAWINGS

The present invention will become better understood with reference to the accompanying drawings which are given only by way of illustration and thus are not limitative of the present invention, wherein;

FIG. 4b is an enlarged view of a portion "A" of FIG. 4a;

MODES FOR CARRYING OUT THE INVENTION

Hereinafter, an exemplary embodiment of the present invention is described with reference to the accompanying drawings according to a preferred embodiment of the invention. It should be understood that the dimension, the shape, etc. provided in the drawings may be exaggerated for the sake of simplicity and convenience in the descriptions. The terminology used herein may change subject to the intension or convention of a user or an operator. The definitions of the terminology used herein should be interpreted as presenting the meaning and concept corresponding to the technical ideas of the present invention.

FIGS. 1a to 6 are cross sectional and enlarged views illustrating a procedure for manufacturing a drive shaft according to an exemplary embodiment of the present invention.

Figure 1A:
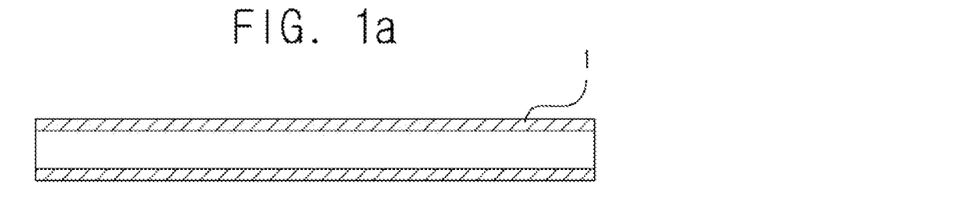
FIG. 1a is a cross sectional view illustrating a metallic pipe used to manufacture a drive shaft.

FIG. 1a is a cross sectional view illustrating a metallic shaft used for manufacturing a drive shaft.

Referring to FIG. 1, a metallic pipe 1 used for manufacturing a drive shaft is formed in a pipe shape with a uniform inner diameter and a uniform outer diameter. For this, the metallic pipe 1 may be made to have a uniform thickness. The metallic pipe 1 has a uniform first strength (or first hardness). The metallic pipe 1 comprises one side portion where a first shaft unit is formed, the other side portion where a second shaft unit is formed, and an intermediate portion which is disposed between the first shaft unit and the second shaft unit.

Figure 1B:
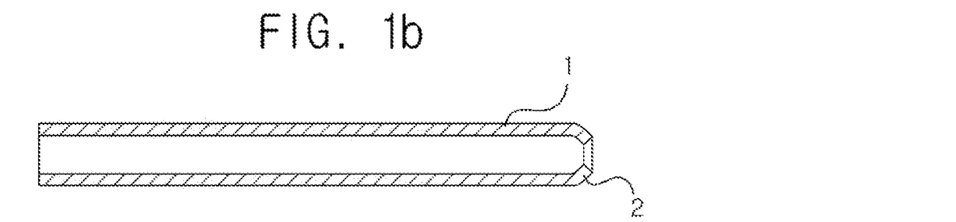
FIG. 1b is a cross sectional view illustrating a forming procedure for forming a first shaft unit at one side of a drive shaft.

FIG. 1b is a cross sectional view illustrating a forming procedure for forming a first shaft unit at one side of a drive shaft.

Referring to FIG. 1b, a forming procedure is performed with respect to one side of the metallic pipe 1 having a uniform thickness and a uniform first strength for the sake of easier insertion into shrinking forms 3a, 3b, 3c, 3d and 3e used for forming a first shaft unit 4 which will be described later.

FIGS. 2a to 2e are cross sectional views illustrating a procedure for forming a first shaft unit at one side of a metallic pipe.

Figure 2A:
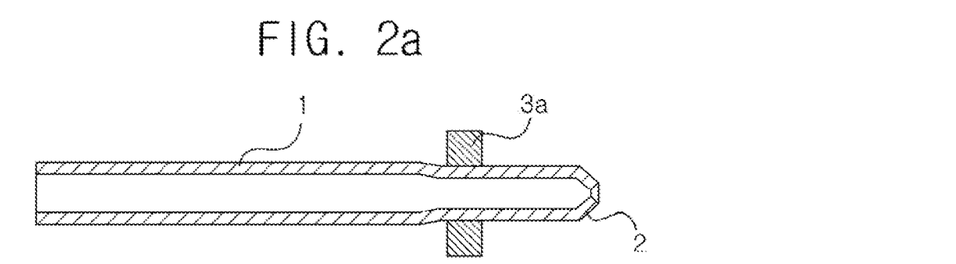
FIGS. 2a to 2e are cross sectional views illustrating a procedure for forming a first shaft unit at one side of a metallic pipe.
Figure 2B:
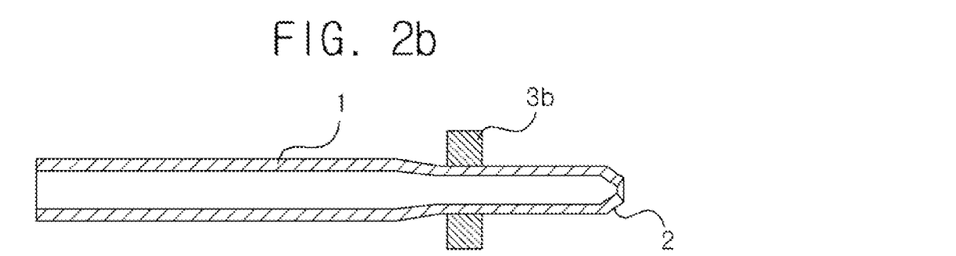
Figure 2C:
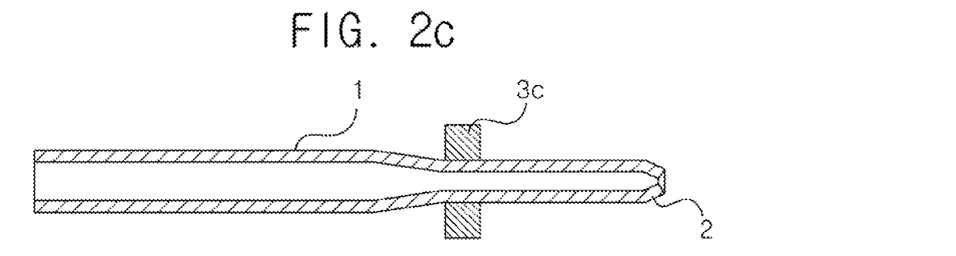
Figure 2D:
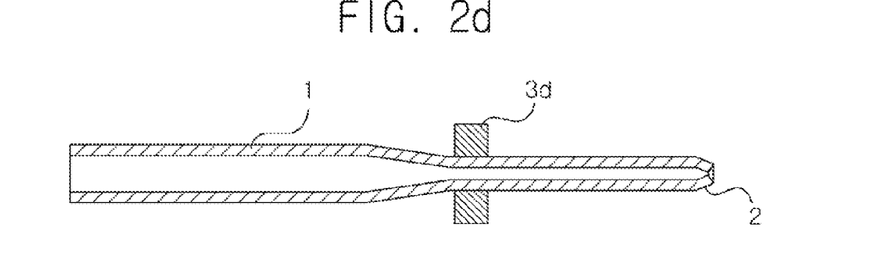
Figure 2E:
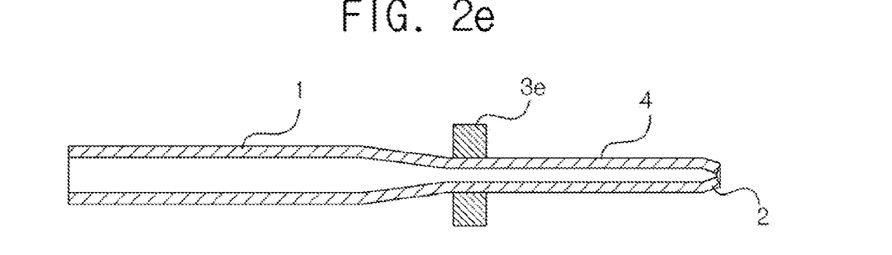

Referring to FIGS. 2a to 2e, an outer diameter and an inner diameter of one side of the metallic pipe 1 are shrunk step by step through a shrinking procedure which is performed with the aids of the shrinking forms 3a, 3b, 3c, 3d and 3e whose diameters are configured to gradually decrease. As illustrated in FIG. 2e, the shrunk first shaft unit 4 is formed at one side of the metallic pipe 1. The first shaft nit 4 has a thickness thicker than the thickness of the metallic pipe 1 during a procedure during which to gradually shrink the outer diameter and the inner diameter of one side of the metallic pipe 1.

The first shaft unit 4, for example, may be processed by any of hot working and cold working.

According to an exemplary embodiment of the present invention, since the first shaft unit 4 is formed in such a way to shrink one side of the thick metallic pipe 1, it is possible to avoid, during the formation of the first shaft unit 4, any of bending, strain, etc. in the metallic pipe 1 where the first shaft unit 4 is not formed.

Figure 3A:
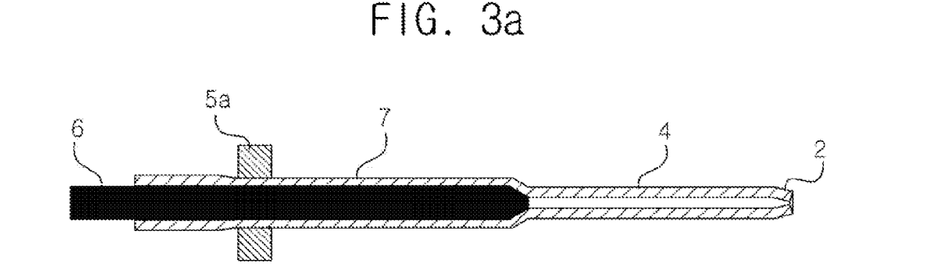
FIGS. 3a and 3b are cross sectional views illustrating a procedure wherein an intermediate portion of a metallic pipe is drawn.
Figure 3B:
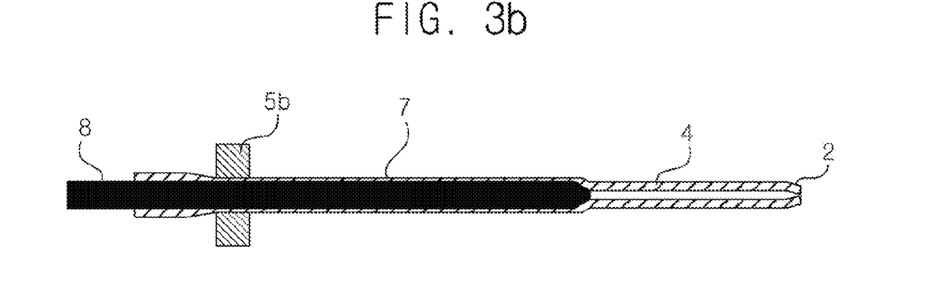

FIGS. 3a and 3b are cross sectional views illustrating a step for drawing an intermediate portion of a metallic pipe.

Referring to FIG. 3a, a mandrel 6 having a circular rod shape is inserted, up to a central portion, into the other side of the metallic pipe 1 at one side of which the first shaft unit 4 is formed. Preferably, but not necessarily, the outer diameter of the mandrel 6 is smaller than the inner diameter of the metallic pipe 1.

The mandrel 6 is inserted from the other side of the metallic pipe 1 where the first shaft unit 4 is formed, into the central portion. The thickness of the central portion where is integral with the first shaft unit 4 in the metallic pipe 1 into which the mandrel 6 is inserted is gradually decreased with the aid of a drawing form 5a, so the metallic pipe 4 is first drawn. In addition, the mandrel 6 may be heteromorphy-processed, thus enhancing the performance of the drive shaft.

According to an exemplary embodiment of the present invention, the other side of the metallic pipe 1 being opposite to the first shaft unit 4 in the metallic pipe 1 is not drawn because the second shaft unit 4 is formed at the other side being opposite to the first shaft unit 4 in the metallic pipe 1.

Hereinafter, the portion whose thickness is gradually decreased after it is drawn with the aid of the drawing form 5a in the metallic pipe 1 may be defined as an intermediate portion 7.

Referring to FIG. 3b, the intermediate portion 7 of the metallic pipe 1 is first drawn with the aid of the drawing form 5a, and the mandrel 8 having an outer diameter smaller than an inner diameter of the first drawn intermediate portion 7 is inserted into the intermediate portion 7 of the metallic pipe 1, and the intermediate portion 7 of the metallic pipe 1 is second drawn with the aid of a new drawing form 5b.

The second drawn intermediate portion 7 of the metallic pipe 1 has a desired outer diameter and a desired thickness. The thickness of the intermediate portion 7 of the metallic pipe 1 is relatively thinner than the thickness of the metallic pipe 1 which is not drawn and the first shaft unit 4. For the sake of a desired outer diameter and a desired thickness, the drawing procedure with respect to the intermediate portion may be performed multiple times with the aid of the mandrels whose diameters gradually decrease.

The intermediate portion 7 of the metallic pipe 1 has a first strength (or first hardness) same as the first shaft unit 4.

Figure 4A:
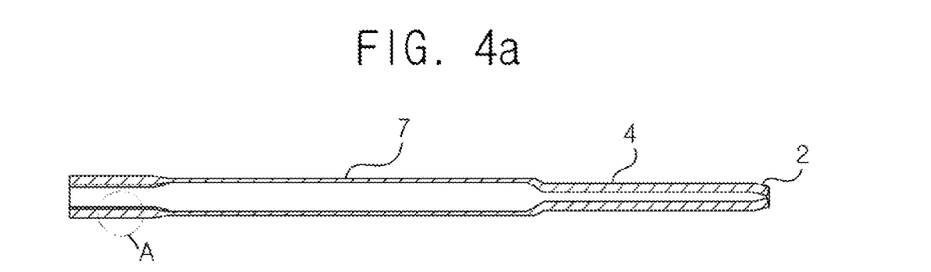
FIG. 4a is a cross sectional view illustrating a procedure for locally heat-treating an inner diameter of the other side being opposite to a first shaft unit of a metallic pipe.
Figure 4B:
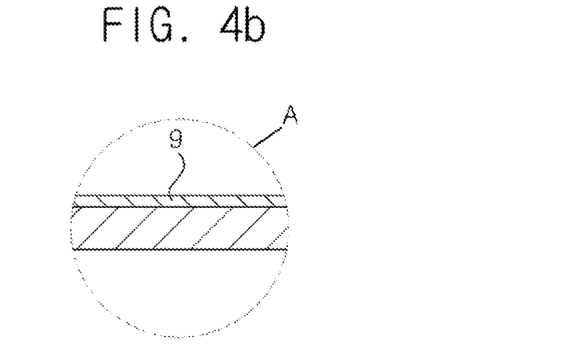

FIG. 4a is a cross sectional view illustrating a procedure for locally heat-treating the inner diameter of the other side being opposite to the first shaft unit of the metallic pipe. FIG. 4b is a partially enlarged view of the portion "A" of FIG. 4a.

Referring to FIGS. 4a and 4b, the first shaft unit 4 is formed in the metallic pipe 1 through the drawing procedure, and a second shaft unit, which will be described later, is formed at the other side being opposite to the first shaft unit 4 in the metallic pipe 1.

In order to form the second shaft unit, it needs to shrink the other side of the metallic pipe 1. In a state that the thickness of the intermediate portion of the metallic pipe 1 has become thinned through the drawing procedure, the other side of the metallic pipe 1 is shrunk with the aid of the shrinking forms. In this case, the intermediate portion may be bent, transformed or cracked.

The above-described problems occur because the intermediate portion of the metallic pipe 1 thinned through the drawing and the portion where the second shaft unit is formed have the same first strength (or first hardness).

According to an exemplary embodiment of the present invention, when forming the second shaft unit at an inner side surface of the other side of the metallic pipe 1 being opposite to the first shaft 4 in the metallic pipe 1, a heat treatment is performed for thereby forming as strength decrease unit 9 at an inner side surface of the other side of the metallic pipe 1.

According to an exemplary embodiment of the present invention, the strength decrease unit 9 formed by the heat treatment at the inner side surface of the other side of the metallic pipe 1 has a predetermined length long enough for forming the second shaft unit, and the strength decrease unit 9 is formed along an inner side surface of the metallic pipe 1.

For example, the heat treatment procedure for forming the strength decrease unit 9 may include a high frequency heat treatment procedure which uses high frequency. The heat treatment conditions in the heat treatment procedure may change depending on the materials of the metallic pipe 1.

According to an exemplary embodiment of the present invention, an annealing heat treatment procedure is performed with respect to an inner side surface of the metallic pipe 1 where the second shaft unit in the metallic pipe 1 is formed by means of a high frequency heat treatment for thereby forming a strength decrease unit 9.

According to an exemplary embodiment of the present invention, preferably, but not necessarily, the thickness of the strength decrease unit 9 is smaller than the entire thickness of the metallic pipe 1, and the thickness of the strength decrease unit 9 may change depending on the properties of the material of the metallic pipe 1.

According to an exemplary embodiment of the present invention, when the strength decrease unit 9 is selectively formed in the portion where the second shaft unit in the inner side surface of the metallic pipe 1 is formed, the portion where the second shaft unit is formed has a second strength (or second hardness) which is smaller than the first strength (or first hardness) of the intermediate portion of the drawn metallic pipe 1.

When the second shaft unit is formed after the strength decrease unit 9 is formed in the portion where the second shaft unit in the metallic pipe 1 is formed, the strength of the portion where the second shaft unit decreases, so process may become easier, while preventing any of bending, strain and cracks at the portion where the second shaft unit is not formed.

FIGS. 5a to 5d are cross sectional and perspective views illustrating a procedure for forming using a divided flat mold a second shaft unit at a metallic pipe which has a strength enforcing unit.

Figure 5A:
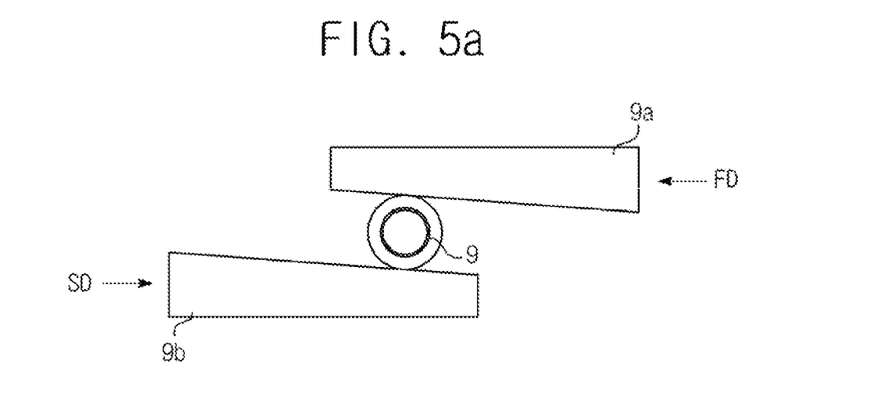
FIGS. 5a to 5d are cross sectional and perspective views illustrating a procedure for forming using a divided flat mold a second shaft unit in a metallic pipe which includes a strength reinforcing unit
Figure 5B:
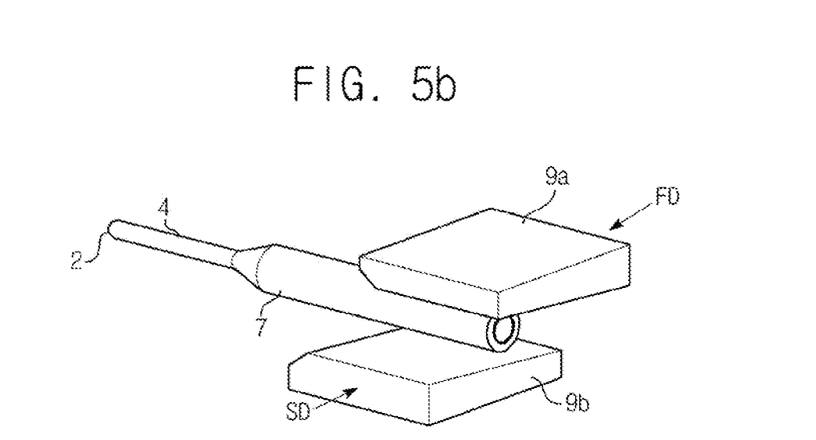
Figure 5C:
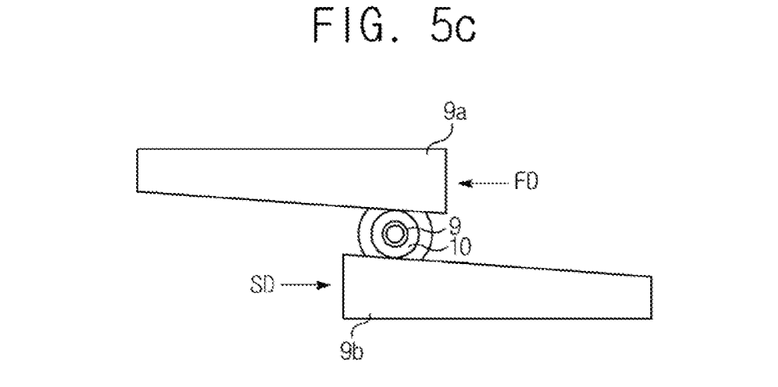
Figure 5D:
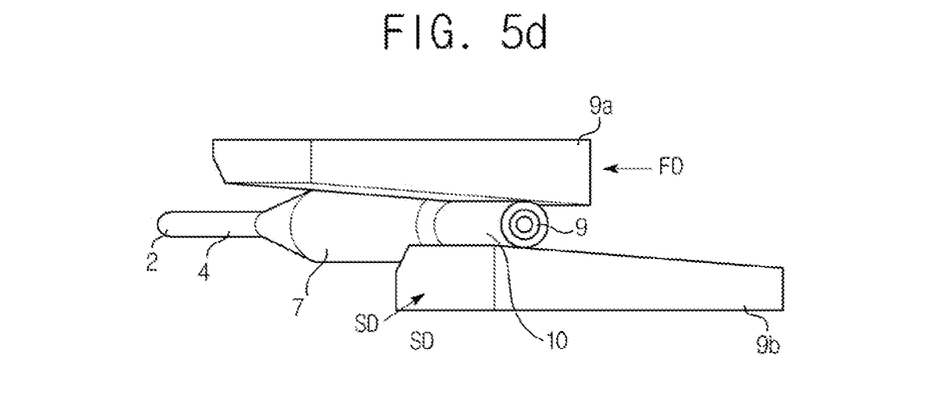

FIGS. 5a and 5b are a cross sectional view and a perspective view each illustrating a state before shrinking a metallic pipe 1 at an inner side of which a strength reinforcing unit 9 is formed. FIGS. 5C and 5D are a cross sectional view and a perspective view each illustrating a state after shrinking a metallic pipe 1 at an inner side of which a strength reinforcing unit 9 is formed.

Referring to FIGS. 5a and 5b, a pair of opposing divided flat molds 9a and 9b are arranged on an outer circumferential surface of the metallic pipe 1 being opposite to the strength reinforcing unit 9 so as to shrink the metallic pipe 1 which has a strength reinforcing unit 9.

The pair of the divided flat molds 9a and 9b are arranged with their outer side surfaces not facing the metallic pipe 1 being parallel with each other. The inner side surfaces coming into contact with the metallic pipe 1 are slanted with respect to the outer side surfaces. The inner side surfaces of each of the pair of the divided flat molds 9a and 9b are slanted with respect to the outer side surfaces so that the opposing surfaces may be parallel with each other.

One of the pair of the divided flat molds 9a and 9b is configured to move with its inner side surface contacting with the metallic pipe 1 in a first direction (FD). The other one of the pair of the divided flat molds 9a and 9b is configured to move with its inner side surface contacting with the metallic pipe 1 in a second direction (SF) which is opposite to the first direction (FD).

At this time, the divided flat molds 9a and 9b move in a state that the interval between both the divided flat molds 9a and 9b is not widened or narrowed.

Referring to FIGS. 5c and 5d, when the divided flat molds 9a and 9b move in the first direction (FD) and in the second direction (SD), a compression force which is vertical with respect to an axial direction is applied by the divided flat molds 9a and 9b to the metallic pipe 1 where the strength reinforcing unit 9 is formed. For this, the metallic pipe 1 which has a strength reinforcing unit 9 is shrunk by means of the compression force which is vertical with respect to the axial direction, and as illustrated in FIG. 5d, as shrunk second shaft unit 10 is formed at the other side of the metallic pipe 1.

According to an exemplary embodiment of the present invention, the metallic pipe 1 which has a strength reinforcing unit 9 is shrunk with the aid of the divided flat molds 9a and 9b, so it is possible to greatly decrease the area where the shrinking apparatus occupies, as compared to when shrinking using a plurality of the shrinking forms, while preventing the axial distortion of the metallic pipe 1 in the course of shrinking, which results in preventing the cracks at a boundary between the portion where the shrinking is performed and the portion where the shrinking is not performed in the course of shrinking.

The second shaft 10 is configured to have a thickness thicker than the thickness of the intermediate portion of the metallic pipe 1 in the course of shrinking the outer diameter and the inner diameter of the other side which is performed with the aid of the divided flat molds 9a and 9b.

The second shaft unit 10 formed with the aid of the divided flat molds 9a and 9b, for example, may be processed any of hot working and cold working.

According to an exemplary embodiment of the present invention, the second shaft unit 10 has a second strength (or second hardness) which is smaller than a first strength (or first hardness) of the intermediate portion of the metallic pipe 1 which has a relatively thinner thickness, so it is possible to prevent any of bending, strain, etc. at the intermediate portion of the metallic pipe 1 in the course of forming the second shaft unit 10.

When the strength decrease unit 9 is formed in an inner side surface of the second shaft unit 10 in an effort to prevent any of bending, strain, cracks, etc. at the intermediate portion of the metallic pipe 1, the strength of the second shaft unit 10 may decrease, so the second shaft unit 10 may be broken due to high stresses.

In order to prevent the above mentioned breaking problem, the first shaft unit 4, the intermediate portion of the metallic pipe 1 which is integral with the first shaft unit 4 and the second shaft unit which is integral with the intermediate portion may be all together heat-treated after the second shaft unit 1 is formed by forming or using the strength decrease unit 9.

The heat treatment procedure may be performed by a high frequency heat treatment process, and the strengths of the first shaft unit 4, the intermediate portion and the second shaft unit 20 may be enhanced by means of the heat treatment process.

Figure 6A:
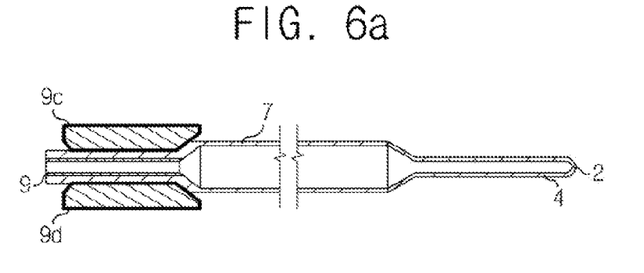
FIGS. 6a and 6b are cross sectional view and a perspective view illustrating as procedure for forming using a divided core mold a second shaft unit in a metallic pipe which includes a strength reinforcing unit.
Figure 6B:
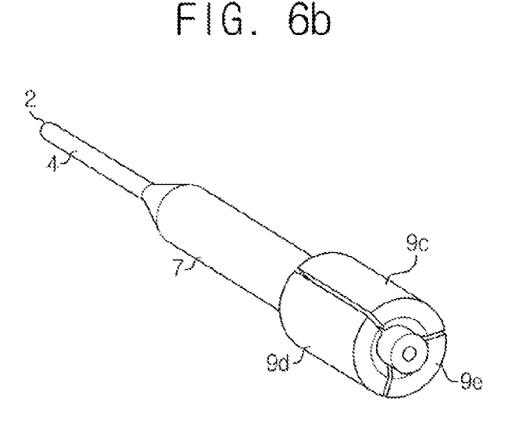

FIGS. 6a and 6b are a cross sectional view and a perspective view each illustrating a procedure for forming using a plurality of divided core molds a second shaft unit in a metallic pipe which has a strength reinforcing unit.

Referring to FIGS. 6a and 6b, a plurality of divided core molds 9c, 9d and 9e which are arranged facing an outer circumferential surface of the metallic pipe 1 are arranged on an outer circumferential surface of the metallic pipe 1 corresponding to the strength reinforcing unit 9 so as to shrink the metallic pipe 1 which has a strength reinforcing unit 9.

The divided core molds 9c, 9e and 9e, for example, are formed by three in number, and the inner side surfaces of the divided core molds 9c, 9d and 9e come into contact with the outer circumferential surface of the metallic pipe 1 which has the strength reinforcing unit 9.

The divided core molds 9c, 9d and 9e are configured to shrink the metallic pipe 1 in such a way that the outer circumferential surface of the metallic pipe 1 receives a compression force in a predetermined direction being vertical with respect to the axial direction of the metallic pipe 1 for thereby shrinking the metallic pipe 1 which has the strength reinforcing unit 9.

Referring to FIGS. 6a and 6b, according to an exemplary embodiment of the present invention, the metallic pipe 1 which has the strength reinforcing unit 9 is shrunk with the aid of the plurality of the divided core molds 9c, 9d and 9e, so it is possible to greatly decrease the area where the shrinking apparatus occupies, as compared with when the shrinking is performed with the aid of a plurality of shrinking molds, while preventing cracks at a boundary between the portion where the shrinking is performed and the portion where the shrinking is not performed in the course of the shrinking.

According to an exemplary embodiment of the present invention, when the metallic pipe 1 is shrunk using the plurality of the divided core molds 9c, 9d and 9e, the shrinking may be performed in a state that the metallic pipe 1 and/or the divided core molds 9c, 9d and 9e are being rotated.

Figure 7:
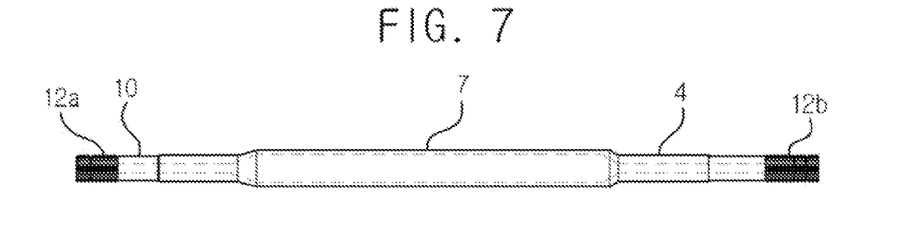
FIG. 7 is a cross sectional view illustrating a state that a spline is formed in first and second shaft units.

FIG. 7 is a cross sectional view illustrating a spline formed at first and second shaft units.

Referring to FIG. 7, when the second shaft 10 is formed with the aid of the divided flat molds 9a and 9b or the divided core molds 9c, 9d and 9e as illustrated in FIGS. 5a to 5d or FIGS. 6a and 6b, splines 12a and 12b are formed in an outer circumferential surface of the first shaft unit 4 and in an outer circumferential surface of the second shaft unit 10, and various turning operations and painting processes are performed, thus manufacturing is drive shaft.

According to an exemplary embodiment of the present invention, as illustrated in FIGS. 1a to 7, the first shaft unit is formed at one side of the metallic pipe, and the drawing process is performed using the first shaft unit and the mandrel, thus forming an intermediate portion, and the strength decrease unit is formed at an inner side surface of the other side of the metallic pipe being opposite to the first shaft unit, and the second shaft unit is formed using the divided flat molds or the divided core molds at the metallic pipe which has the strength decrease unit.

As illustrated in FIGS. 1a to 7, the method for manufacturing the drive shaft may be well applied to the structure wherein the spline is formed at both sides of the drive shaft.

However, the drive shaft may be constituted in a structure wherein the spline is formed at one side of the two sides. In the structure where the spline is formed at one side, preferably, but not necessarily, there is provided a metallic pipe which has a uniform thickness and a first strength and has a shrinking portion which has a predetermined length from one side. In order to form, in the shrinking portion, a strength decrease unit which has a second strength being smaller than the first strength, the heat treatment procedure is performed by heat-treating the inner side surface of the shrinking portion, and the shrinking portion of the metallic portion which has the strength decrease unit is shrunk with the aid of the divided flat molds or the divided core molds, thus manufacturing a drive shaft by forming the shrunk shaft unit in the metallic pipe without bending any portion of the metallic pipe.

In the method for manufacturing a drive shaft as illustrate in FIGS. 1a to 7, the first shaft unit is formed in the metallic pipe, and the drawing process is performed, and the portion where the second shaft unit is formed is heat-treated. Alternatively, the heat-treatment procedure of the inner side surface of the metallic pipe may be performed before the formation of the first shaft unit and before the drawing procedure is performed. More specifically, the heat-treatment procedure may be performed in any procedure before the second shaft unit is formed.

In the method for manufacturing a drive shaft as illustrated in FIGS. 1a to 7, the first shaft unit, the intermediate portion and the second shaft unit are all heat-treated again. Alternatively, it is possible to selectively heat-treat only the second shaft unit in order to increase the strength of the second shaft unit which has the strength decrease unit.

As described above, the strength decrease unit is selectively formed through the heat-treatment procedure, at the inner side surface of the shrinking portion where is used for forming the spline in the drive shaft, thus preventing the bending, strain, cracks, etc. at the portion where is not shrunk in the course of shrinking, while decreasing the area where the shrinking apparatus occupies and preventing the distortion and cracks during in the course of shrinking.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for manufacturing a drive shaft, comprising:
providing a metallic pipe having a first pipe portion at one end of the pipe, a second pipe portion at an opposite end of the pipe, an intermediate pipe portion between the first and second pipe portions, the metallic pipe further including an inner circumferential surface, an outer circumferential surface and a central axis defining an axial direction of the pipe;
forming a first shaft unit by shrinking the first pipe portion of the metallic pipe such that the first shaft unit has a first strength;
decreasing the thickness of the intermediate pip portion of the metallic pipe by drawing down the intermediate pipe portion which is integral with the first shaft unit;
forming a strength decrease unit at an inner surface of the second pipe portion of the metallic pipe by heat treating such that the strength decrease unit has a second strength smaller than the first strength, and the second pipe portion is spaced from the first pipe portion; and
forming a second shaft unit by shrinking the second pipe portion of the metallic pipe;
wherein the second shaft unit is formed by applying a compression force to the second pipe portion in a vertical direction with respect to the axial direction of the metallic pipe;
and providing divided flat molds with an outside surface and inside slanted contact surfaces for applying the compression force to the second pipe portion and wherein the second shaft unit is formed by moving the divided flat molds with slanted contact surfaces into contact with the outer circumferential surface of the metallic pipe at the second pipe portion.

2. The method of claim 1, wherein the forming of the first shaft unit comprises:
forming a beveled end of the first pipe portion of the metallic pipe; and
shrinking the first pipe portion step by step using a plurality of shrinking forms having inside diameters that gradually decrease.

3. The method of claim 1, wherein the first shaft unit and the intermediate pipe portion have inner and outer diameters and a thickness between the outer diameter and the inner diameter of the first shaft unit is thicker than the thickness between the outer diameter and the inner diameter of the intermediate pipe portion.

4. The method of claim 1 wherein the divided flat molds include a pair of divided flat molds, with each mold in the pair having the inner side surfaces that are slanted for contacting with the metallic pipe.

5. The method of claim 1, wherein the second shaft unit and the intermediate pipe portion have inner and outer diameters and the thickness between the outer diameter and the inner diameter of the second shaft unit is thicker than the thickness between the inner and outer diameter of the intermediate pipe portion.

6. The method of claim 1, wherein the drawing down of the intermediate pipe portion of the metallic pipe comprises:
inserting a mandrel into the metallic pipe; and
decreasing the thickness of the intermediate pipe portion by inserting the metallic pipe into a drawing mold.

7. The method of claim 1, wherein the heat-treating comprises:
a high frequency heat treatment step for applying high frequency to the inner circumferential surface of the second pipe portion of the metallic pipe.

8. The method of claim 1, wherein in the forming of the first and second shaft units, the first and second shafts are formed by any of hot working and cold working.

9. The method of claim 1, wherein the strength decrease unit and the metallic pipe have inner and outer diameters and the thickness between the inner and outer diameter of the strength decrease unit is smaller than the thickness between the inner and outer diameters of the metallic pipe.

10. The method of claim 1, further comprising, after the second shaft unit is formed, heat-treating again the first shaft unit, the intermediate pipe portion and the second shaft unit.

11. The method of claim 1, further comprising, after the second shaft unit is formed, heat-treating again only the second shaft unit.

12. The method of claim 1, further comprising, after the second shaft unit is formed, forming a spline at at least one of the first shaft unit and the second shaft unit.

13. The method of claim 1, wherein the first shaft unit and the second shaft unit and the intermediate pipe portion have inner and outer diameters and the thickness between the inner and outer diameter of either the first shaft unit or the second shaft unit is thicker than the thickness between the outer diameter and the inner diameter of the intermediate pipe portion.

* * * * *